(12) United States Patent
Gubeskys et al.

(10) Patent No.: US 7,940,738 B2
(45) Date of Patent: May 10, 2011

(54) WIRELESS COMMUNICATION UNIT AND METHOD FOR PROCESSING A CODE DIVISION MULTIPLE ACCESS SIGNAL

(75) Inventors: Arik Gubeskys, Hod Hasharon (IL); Amir Chass, Ramat Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 389 days.

(21) Appl. No.: 11/570,302

(22) PCT Filed: May 23, 2005

(86) PCT No.: PCT/IB2005/051668
§ 371 (c)(1),
(2), (4) Date: Dec. 8, 2006

(87) PCT Pub. No.: WO2005/122420
PCT Pub. Date: Dec. 22, 2005

(65) Prior Publication Data
US 2008/0267156 A1 Oct. 30, 2008

(30) Foreign Application Priority Data
Jun. 8, 2004 (EP) .................................... 04013505

(51) Int. Cl.
*H04B 7/216* (2006.01)
(52) U.S. Cl. ..................... 370/342; 455/63.1; 455/68
(58) Field of Classification Search .......... 370/335–347, 370/267, 290, 292, 500, 465, 491; 455/500, 455/515, 517, 526, 68, 70, 78, 83, 88, 553.1, 455/102, 226.1
See application file for complete search history.

(56) References Cited

U.S. PATENT DOCUMENTS

| | | | | |
|---|---|---|---|---|
| 6,539,205 | B1* | 3/2003 | Wan et al. | 370/465 |
| 7,158,558 | B2* | 1/2007 | Petre et al. | 375/147 |
| 2002/0168040 | A1* | 11/2002 | Coffey | 375/350 |
| 2003/0185165 | A1* | 10/2003 | Ishii et al. | 370/317 |
| 2004/0001539 | A1* | 1/2004 | Sankaran et al. | 375/231 |
| 2004/0228295 | A1* | 11/2004 | Zhang et al. | 370/320 |
| 2005/0180493 | A1* | 8/2005 | Hooli et al. | 375/148 |
| 2008/0089403 | A1* | 4/2008 | Hooli et al. | 375/232 |

FOREIGN PATENT DOCUMENTS
WO 2004004260 A 1/2004

OTHER PUBLICATIONS

Control Channel Assisted Chip Equalization for CDMA Downlink Adaptive Modulation and Coding System, Arik Gubeskys et al, IEEE, Sep. 2005.*
Petre et al; "Space-Time Chip Equalizer Receivers for WCDMA Downlink with Code-Multiplexed Pilot and Soft Handover"; Global Telecommunications Conference, 2001. GLOBECOM '01. IEEE vol. 1, Nov. 25-29, 2001 pp. 280-284 vol. 1.
Gubeskys, et al.; Control Channel Assisted Chip Equalization for CDMA Downlink Adaptive Modulation and Coding System; IEEE; Sep. 2005.
Petre, et al.; "Space-Time Chip Equalizer Receivers for WCDMA Forward Link with Time-Multiplexed Pilot"; 2001; IEEE.

* cited by examiner

*Primary Examiner* — Jinsong Hu
*Assistant Examiner* — Michael Nguyen (57) ABSTRACT

A method of processing a code division multiple access signal comprises receiving a CDMA signal; processing the received CDMA signal with a CDMA detector; and extracting control channel information from the processed signal. The extracted control channel information is used to equalize a subsequent received CDMA signal, to make estimation of equalizer coefficients more reliable and increasing average data throughput.

32 Claims, 3 Drawing Sheets

WIRELESS COMMUNICATION UNIT AND METHOD FOR PROCESSING A CODE DIVISION MULTIPLE ACCESS SIGNAL

FIELD OF THE INVENTION

This invention relates to Code Division Multiple Access (CDMA) detectors, and CDMA receivers comprising CDMA detectors. This invention is particularly applicable to CDMA receivers and detectors for use in Universal Mobile Telephone System (UMTS) systems, where equalization of received signals is required.

BACKGROUND OF THE INVENTION

Wireless communication systems, for example cellular telephony or private mobile radio communication systems, typically provide for radio telecommunication links to be arranged between a plurality of base transceiver stations (BTS), referred to as Node Bs with regard to $3^{rd}$ generation (3G) cellular systems such as the universal mobile telecommunication system (UMTS) systems, and a plurality of subscriber units, often referred to as user equipment (UE) in UMTS systems. The communication link from a Node B to a UE is generally referred to as a down-link communication channel. Conversely, the communication link from a UE to a Node B is generally referred to as an up-link communication channel.

In such wireless communication systems, techniques for communicating information simultaneously exist, where communication resources are shared by a number of users. Such techniques of sharing resources are termed multiple access techniques. A number of multiple access techniques exist, whereby a finite communication resource such as frequency and/or time is divided into any number of physical parameters, such as frequency channels or time periods (slots/frames, etc.).

The present invention will be described with respect to a $3^{rd}$ generation partnership project (3GPP) communication system based on the UMTS standard. 3 G communication systems employ a Code Division Multiple Access (CDMA) technique, whereby substantially all communications are able to use a selection from all of the respective frequencies in all of the available time periods. In effect, the resource is shared by allocating each communication a particular code in order to differentiate desired signals from undesired signals. This is often referred to as spread spectrum signaling. Some communication resources (often termed channels) are used for carrying data (traffic) and other channels are used for transferring control information, such as call paging, between the Node B and the UEs.

Two categories of spread spectrum communications are direct sequence spread spectrum (DSSS) and frequency hopping spread spectrum (FHSS). In the case of a DSSS communication system, for example, multiplying the data content of the signal with a wide-band pseudo-random code can most easily spread the spectrum of a signal. It is essential that the receiver precisely know the spreading signal, so that the receiver is able to 'de-spread' the signal, in order to recover its original content. A cellular communication system using DSSS is commonly known as a Direct Sequence Code Division Multiple Access (DS-CDMA) system, one example of which is defined in the TIA-EAI standard IS-95. Thus, individual users in the system use the same radio frequencies (RF) and time slots, but they are distinguishable from each other by the use of individual spreading codes. Hence, multiple communications channels are allocated using a number of spreading codes within a portion of the radio spectrum. Each code is uniquely assigned to a UE, except for common channels.

In order to decode the correct spreading code, a special form of signal receivers is used, often referred to as RAKE receivers. RAKE receivers employ equalization functions to equalize signals appearing at different time instances, when transmitted on different frequency channels. Such signals may also suffer from multipath and other wireless propagation effects that need to be compensated for by the receiver's equalizer function.

However, in the art of CDMA systems, it is known that RAKE receivers do not provide an adequate performance in the presence of severe interference, such as multiple access interference (MAI) or inter-symbol (ISI) interference. Hence, there is a constant demand for enhancing a CDMA receiver's performance, particularly in the context of a UE receiver downlink performance, by designing improved spread spectrum receivers.

One of the most promising candidates to replace the well-known RAKE receiver is a linear chip equalizer, which is designed especially for the downlink channel. The performance of chip equalizers is evaluated by 3GPP, and most probably will be a basis for performance requirements of the future release of the high-speed data packet access (HSPDA) standard within 3G systems.

A. Klein describes an equalizer for a CDMA downlink channel using linear zero-forcing (ZF) and minimum-mean-squared-error (MMSE) techniques, in the paper "Data detection algorithms specially designed for the downlink of CDMA mobile radio systems", VTC'97. In this paper, the equalization problem is solved on a data 'symbol' level, in a sense that the optimization of the mean-squared error is performed on the despreaded user symbol.

Another approach to equalization is to consider the composite chip sequence, which is the sum of spreaded signals of all users in a cell. A processor in the receiver unit then solves the ZF and MMSE problems on a chip level, rather than at a symbol level. An example of such an approach is described in I. Ghauri and D. T. M. Slock's paper: "Linear receivers for the DS-CDMA downlink exploiting orthogonality of spreading sequences".

A relatively simple solution to the aforementioned problem can be obtained if the composite chip sequence is assumed to be independent and identically distributed (iid), as described by T. P. Krauss, M. D. Zoltowski and G. Leus, in their paper "Simple MMSE equalizers for CDMA downlink to restore chip sequence: comparison to zero-forcing and RAKE". In this case, no spreading/scrambling code information is needed and the co-efficients of the linear equalizer are found using the channel response and the noise variance only.

Since in reality the channel response is not known by the receiver, the most common approach is to use a training sequence for channel estimation and computation of the equalizer taps. In the 3G cellular WCDMA standard, a code-multiplexed 'pilot' signal is provided. The pilot signal is used for the purpose of providing a training sequence that undergoes substantially the same propagation conditions as the primary data transmitted on the traffic channel. The decoded pilot signal is then used for channel estimation and computation of the equalizer taps (filter co-efficients). The pilot signal may be employed in either a block-based or adaptive equalizer configuration, for example as described in the paper by: F. Petre, M. Moonen, M. Engels, B. Gyselinckx and H. De Man, titled "Pilot-aided adaptive chip equalizer receiver for interference suppression in DS-CDMA forward link", published in VTC 2000.

It is known that the performance of an equalizer relying on the pilot signal technique can be improved by a semi-blind approach, as described in the paper by: F. Petre, G. Leus, M. Engels, M. Moonen and H. De Man, titled "Semi-blind space-time chip equalizer receivers for WCDMA forward link with code-multiplexed pilot", published in ICASSP'01. This technique is based on optimization using the equalizer's filter coefficients and transmitted data. The clear drawback in this case is higher complexity, since a semi-blind equalizer requires auto-correlation and cross-correlation properties of the user codes. These problems are compounded in the case of a long scrambling code, as the codes change from symbol-to-symbol.

Another important path in the evolution of existing cellular communication systems is the introduction of an adaptive modulation and coding (AMC) technology. The idea of AMC systems is to adapt the modulation and the coding rate, and consequently to vary the data rate, according to the prevailing channel conditions. Typically, such systems employ a special downlink control channel signaling comprising the modulation type, coding rate and other parameters needed for decoding of the transmitted data. It is known that for 'poor' channel conditions the data rate is reduced, whereas for a 'good channels' the data rate is increased up to the maximum extent, at which it can still be copied by a UE. Thus, by employing AMC the average data throughput of the communication system is increased.

A need therefore arises for a CDMA receiver to provide increased data throughput, particularly with regard to adaptive modulation and coding WCDMA communication systems.

STATEMENT OF INVENTION

The present invention provides a method of processing a code division multiple access (CDMA) signal, a storage medium, a signal processing device, a wireless communication unit and a wireless communication system, as described in the accompanying Claims.

In summary, the present invention utilizes CDMA control channel transmissions in addition to, or as an alternative to, pilot signals for decoding and using as a training sequence in the equalization of received signals. In this manner, when used in addition to pilot signals, estimation of equalizer coefficients can be performed more reliably. Furthermore, by using more reliable signals as an equalizer training sequence the mechanism increases maximal data throughput significantly.

BRIEF DESCRIPTION OF THE DRAWINGS

Embodiments of the present invention will now be described, by way of example only, with reference to the accompanying drawings, in which.

DESCRIPTION OF PREFERRED EMBODIMENT

The preferred embodiment of the present invention focuses on chip equalization in adaptive modulation and coding (AMC) systems, in which a data channel is accompanied by a control channel carrying information used in the data detection/decoding process. It is known that it is critical to decode accurately the parameters carried over the control channel in order to use this control data in being able to correctly decode the received data. Thus, an error in a single bit of control information could well result in all corresponding received data being unusable.

Therefore, in general, the control channel information is very well protected using, for example, resilient error correction codes, a high spreading factor and a low modulation order, when compared to the spreading factor and modulation order of the corresponding data channel. In recognition of this fact, the inventors of the present invention have appreciated that such control information may be used in a novel and inventive manner as a training sequence to 'train' the CDMA receiver, in contrast to, or in addition to, using specific, additional pilot signals. In this regard, a high confidence factor in the accuracy of the decoded control channel symbols of the control channel, after performing error correction, can be used in addition to, or as replacement for, pilot symbols.

Figure 1:
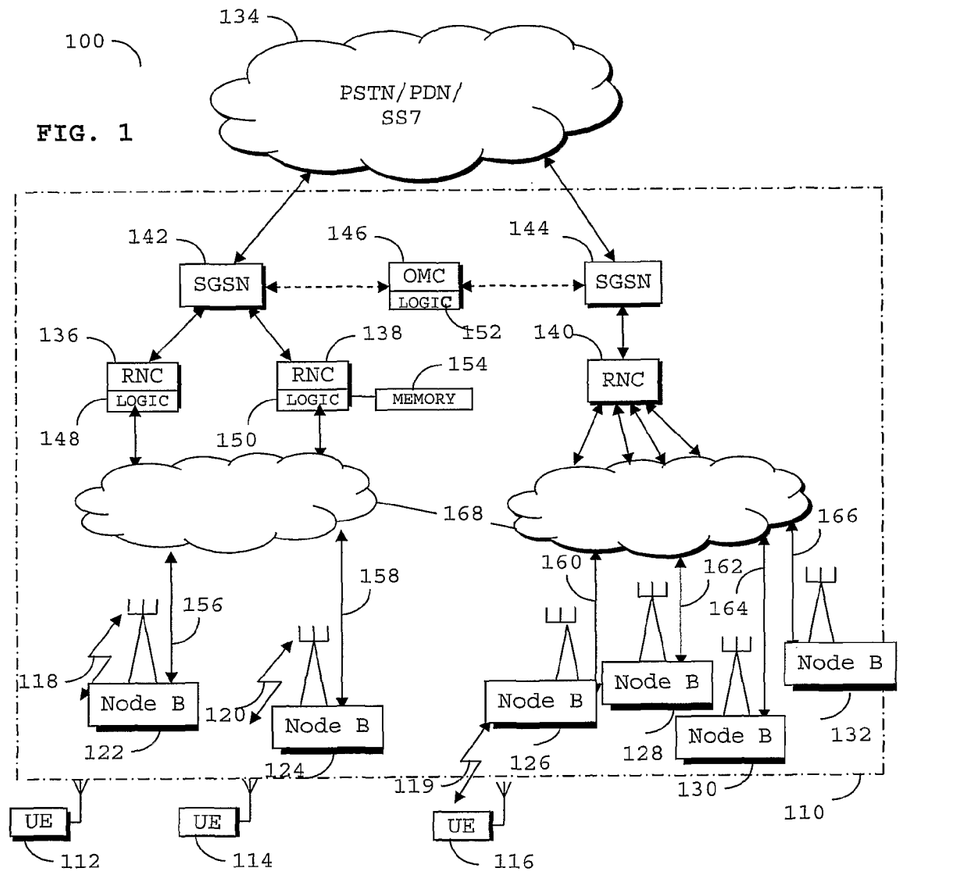
FIG. 1 illustrates a block diagram of a wireless communication system supporting wireless communication units that can be adapted to support the various inventive concepts of a preferred embodiment of the present invention.

Referring first to FIG. 1, a cellular-based telephone communication system 100 is shown in outline, in accordance with a preferred embodiment of the invention. In the preferred embodiment of the invention, the cellular-based telephone communication system 100 is compliant with, and contains network elements capable of operating over, a UMTS/3G air-interface, such as the High Speed Data Packet Access (HSPDA) system belonging to the 3G wideband CDMA (WCDMA) cellular standard. HSPDA is targeted towards supporting high-speed wireless applications. However, it is within the contemplation of the present invention that the techniques and apparatus proposed herein are equally applicable to any equalizer-based CDMA wireless communications system, and particularly any synchronous DS-CDMA communication system that employs substantially concurrent data and control channel transmissions.

A plurality of subscriber terminals (or user equipment (UE) in UMTS nomenclature) 112, 114, 116 communicate over radio links 118, 119, 120 with a plurality of base transceiver stations, referred to under UMTS terminology as Node-Bs, 122, 124, 126, 128, 130, 132. The system comprises many other UEs and Node Bs, which for clarity purposes are not shown.

The wireless communication system, sometimes referred to as a Network Operator's Network Domain, is connected to an external network 134, for example the Internet. The Network Operator's Network Domain (described with reference to both a 3$^{rd}$ generation UMTS) includes:

(i) A core network, namely at least one Gateway GPRS Support Node (GGSN) 144 and/or at least one Serving GPRS Support Nodes (SGSN); and (ii) An access network, namely:

(a) A Radio network controller (RNC) 136-140; and (b) A UMTS Node B 122-132.

The UE communicates data with a Node B in the network access domain via a wireless U$_u$ interface. The Node B effectively operates as a base station, i.e. a wireless serving communication unit. The Node-Bs 122-132 are connected to external networks, through base station controllers, referred to under UMTS terminology as Radio Network Controller stations (RNCs) 136, 138, 140, via an $I_{ub}$ interface. The RNC is responsible for the control and allocation of resources for numerous Node B's; typically 50 to 100 Node B's may be controlled by one RNC. RNCs communicate with each other (via the interface $I_{ur}$) to support handover and macro-diversity.

The RNC communicates with a SGSN in a serving network domain via an $I_u$ interface. The SGSN is the UMTS Core Network element responsible for Session Control and interface to the Location Registers. The SGSN is a large centralized controller for many RNCs.

Within the serving network domain, the SGSN communicates with a GGSN via a $G_n$ interface. The GGSN (170B) is the UMTS Core Network element responsible for concentrating and tunneling user data within the core packet network to the ultimate destination (e.g., Internet service provider (ISP) via a $Y_u$ interface.

An Operations and Management Centre (OMC) 146 is operably connected to RNCs 136-140 and Node-Bs 122-132 (shown only with respect to Node-B 126 for clarity). The OMC 146 administers and manages sections of the cellular telephone communication system 100, as is understood by those skilled in the art.

The inventive concepts of the present invention are described with reference to transmission of HSPDA services over a high-speed shared data channel (HS-DSCH) from a Node B to a plurality of UEs. Thus, when supporting such services, the high-speed shared data channel is shared amongst all users operating within a cell. The UEs are assigned orthogonal variable spreading factor (OVSF) codes and corresponding transmission time intervals by their serving Node B. Notably, in the preferred embodiment of the present invention, the data channel is accompanied by the High-Speed Shared Control CHannel (HS-SCCH).

The inventive concepts described herein reverse the current methodology on equalizer training in the UE 112-116, in that pilot symbols inserted into a data transmission are not the sole mechanism for training a UE's equalizer. The preferred embodiment of the present invention is described with reference to using control symbols decoded from the HS-SCCH, together with pilot symbols, for chip equalizer training. However, it is envisaged that in some instances, the use of control symbols decoded from the HS-SCCH may be employed as the sole mechanism in equalizer training.

In the case that control symbols were received correctly a better estimation of the equalizer coefficient is obtained. If the control signal is received erroneously, it does not assist equalizer training in any way, and has a very negative impact on equalizer training. However, in an AMC system, if the control was received erroneously, the data can never be decoded; irrespective of how badly the equalizer is trained, as the necessary parameters for decoding have not been received.

Figure 2:
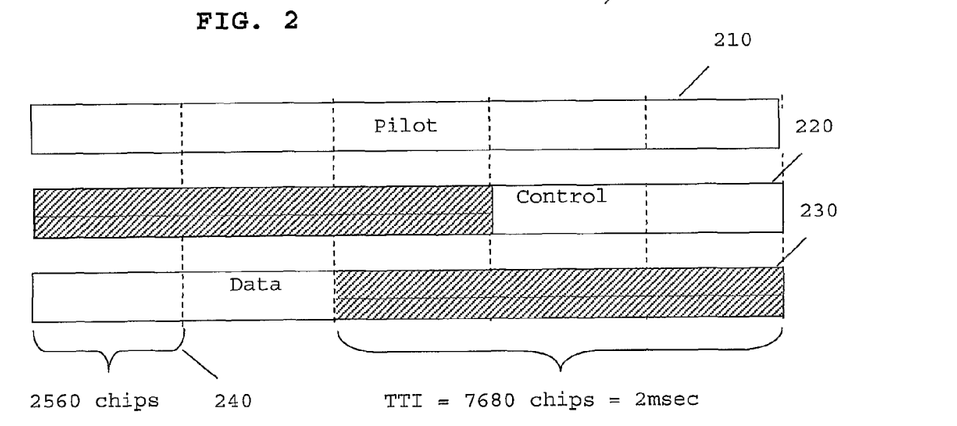
FIG. 2 illustrates a timing diagram of a 3G wireless communication system supporting HSPDA, i.e. concurrent data channel and control channels, as utilized by the preferred embodiment of the present invention.

Referring now to FIG. 2, a timing diagram 200 illustrates the time lag between sending control channel information and real data in a HSPDA CDMA system. In essence, the HSPDA CDMA system supports a separate channel 210 for pilot signals, which is sufficiently coherent to the other channels used to assist in equalizing signals received from the other channels. Control information is sent over the control channel 220, with a time lag of two slots 240 (of '2560' chips in length) before the corresponding data is sent over the data channel 230. Thus, a UE is able to monitor and decode a portion of the control channel 220 to ascertain whether it is scheduled for receiving data in the next data transmission interval on the data channel 230. This determination is performed by decoding the user identity information.

If the data is indeed scheduled for the UE, the remaining portion(s) of the information carried by the control channel 220 is/are decoded. This control information is necessary in order to correctly demodulate and decode the whole of the data being carried on the data channel. The mechanism employed by the UE to perform this decoding/equalization technique is described with reference to FIG. 3.

Figure 3:
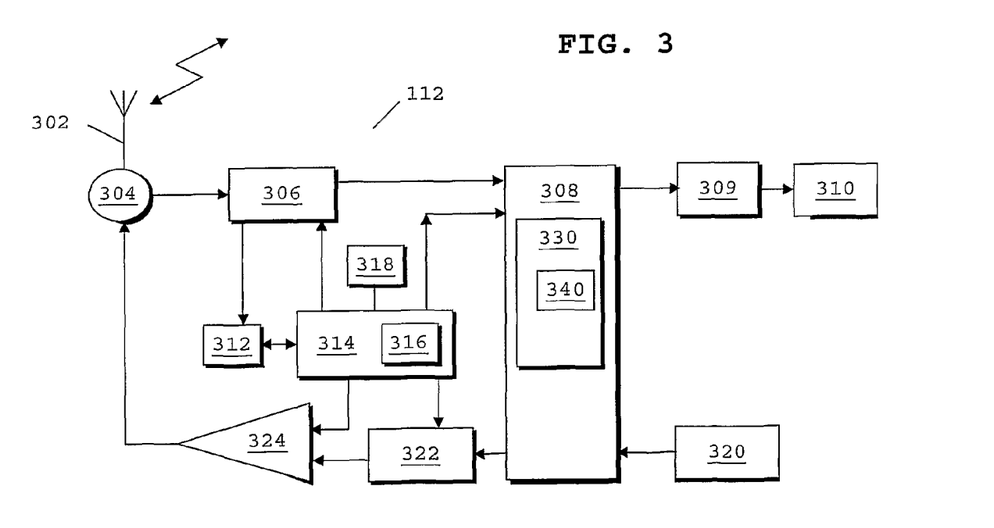
FIG. 3 illustrates a functional block diagram of a wireless communication unit that can be adapted to support the various inventive concepts of a preferred embodiment of the present invention.

Referring now to FIG. 3, a block diagram of a wireless subscriber communication unit (UE) is illustrated, for example UE 112 of FIG. 1. The UE 112 is adapted to support the inventive concepts of the present invention.

The UE 112 comprises an antenna 302 preferably coupled to a duplex filter or antenna switch 304 that provides isolation between receive and transmit chains within UE 112. The receiver chain includes receiver front-end circuitry 306 (effectively providing reception, filtering and intermediate or baseband frequency conversion). The front-end circuit 306 scans signal transmissions from its associated Node B. The front-end circuit 306 is serially coupled to a signal processing function (generally realized by a digital signal processor (DSP)) 308. The final receiver circuits are a baseband 'back-end' circuit 309 operably coupled to a display unit 310. Notably, the signal processing function 308, coupled to the baseband back-end circuit 309, incorporates a CDMA detector 330 comprising an equalizer function 340.

As HSPDA is an adaptive modulation and coding system, the user does not know in advance the modulation and coding rate of the transmitted data, or even which and how many OVSF codes were used. In accordance with the preferred embodiment of the present invention, the signal processor function 308 has been adapted to utilize control channel information decoded from received control channel signals. The signal processing function 308 then uses these control channels signals within the equalizer function 340 to equalize subsequently received data packets. This process is further described with reference to FIG. 4.

The transmission of control channel information from the Node B to the UE over the control channel is described, for example, in the paper by: A. Das, F. Khan, A. Sampath and H. Su, titled "Design and performance of downlink shared control channel for HSPDA", and published in PIMRC 2002.

For completeness, the UE also comprises a controller 314 preferably operably coupled to the front-end circuitry 306 so that the receiver is able to calculate receive bit-error-rate (BER) or frame-error-rate (FER) or similar link-quality measurement data from recovered information via a received signal strength indication (RSSI) 312 function. The RSSI 312 function is operably coupled to the front-end circuit 306. A memory device 316 stores a wide array of UE-specific data, such as decoding/encoding functions, timing details, neighbor and serving cell information relating to timing, channels, power control and the like. A timer 318 is operably coupled to the controller 314 to control the timing of operations, namely the transmission or reception of time-dependent signals, within the UE 112.

For completeness, in broad terms, the transmit chain of the UE 112 essentially includes an input device 320, such as a microphone and/or keypad, coupled in series through a signal processor function 308, transmitter/modulation circuitry 322 and a power amplifier 324. The signal processor function 308, transmitter/modulation circuitry 322 and the power amplifier 324 are operationally responsive to the controller, with an output from the power amplifier coupled to the duplex filter or antenna switch 304, as known in the art.

Figure 4:
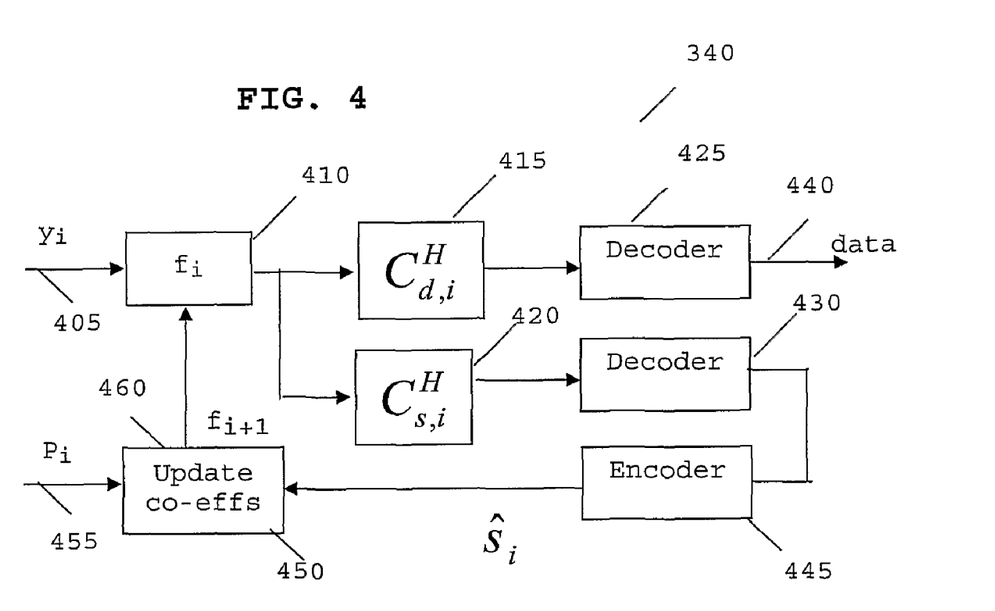
FIG. 4 illustrates a functional block diagram of an equalizer function of a CDMA communication unit, equivalent to the equalizer's process steps, adapted to support the various inventive concepts of the preferred embodiment of the present invention.

Referring now to FIG. 4, a more detailed view of the equalizer function 340 is illustrated. A skilled person may better appreciate the equalizer function by detailing the mathematical operations involved in the process. Hence, let us define a CDMA transmission comprising column vectors p, s and d, containing pilot, control and data symbols respectively, where this transmission is received during some time interval. Let us denote a number of pilot symbols 'B' received during that time. The respective spreading factors of the channels are: data channel—'16'; control channel—'128'; and pilot channel—'256'. It is therefore possible to conclude that the number of control symbols received over the same time interval is '2B' and the number of pilot symbols received over the same time interval is '16B'.

Therefore, dimensions of the respective vectors can be determined, namely:

p–B×1, s–2B×1 and d–16B×1.

Let us assume a sequence $c_n$ that represents an aperiodic spreading code, which is obtained by multiplication of an OVSF code with the aperiodic cell-specific scrambling code.

Then, let us define a spreading factor (SF) B×B code matrix C as:

$$C = \begin{Bmatrix} c_0 \\ c_1 \\ \vdots \\ c_{sf-1} \\ & c_{sf} \\ & c_{sf+1} \\ & \vdots \\ & c_{2sf-1} \\ & & \ddots \\ & & & c_{sf\cdot B-1} \end{Bmatrix} \quad [1]$$

Where the sequence $c_n$ is normalized such that $C^H C = I$.

According to the definition, the products Cq and $C^H z$ represent spreading and despreading operations respectively, assuming:

q is a B×1 vector of symbols; and
z is a SF.B×1 vector of chips.

Then, the multi-user chip signal can be written as:

$$x = \alpha_p C_p p + \alpha_s C_s s + \sum_k \alpha_k C_{d,k} d_k \quad [2]$$

Where:
k is the user index;
$C_p$, $C_s$ and $C_d$ are the pilot, control and user code matrices; and
α is the weight of the user (or pilot/control) chip sequence in the overall multi-user chip sequence. The multi-user chip sequence is transmitted over the radio channel with impulse response 'h'.

The received signal is:

$$y = Hx + n \quad [3]$$

Where:
n is additive white Gaussian noise; and
H is a Toeplitz convolution matrix based on the channel response 'h'.

The minimum mean square estimation (MMSE) solution for estimating multi-user chip sequence can be readily derived assuming the channel response is known, for example as shown in I. Ghauri and D. T. M. Slock's paper: "Linear receivers for the DS-CDMA downlink exploiting orthogonality of spreading sequences". For an unknown channel response the equalizer can be trained using the pilot symbols, either on a block-by-block basis or in a sample-by-sample adaptive configuration. However, a skilled artisan will appreciate that many other possible adaptation schemes are possible.

If we focus on the block equalizer, it is possible to identify that the coefficients of vector 'f' can be found by solving a least squares (LS) minimization problem:

$$C_p^H Y f = p \quad [4]$$

Where:
Y is a Toeplitz convolution matrix based on vector y.

This equalizer is based on the known technique of using only pilot symbols. The solution is:

$$f = (Y^H C_p C_p^H Y)^{-1} Y^H C_p p \quad [5]$$

or in the case of an underdetermined LS problem:

$$f = Y^H C_p (C_p^H Y Y^H C_p)^{-1} p \quad [6]$$

In a HSPDA system the correct detection of the control channel is a necessary condition for the correct detection of the data channel. If the detection of control information was unsuccessful, the decoded data channel will certainly be erroneous. Therefore, for the purpose of equalization we may assume that the decoded control information is always correct. Thereafter, in accordance with the preferred embodiment of the present invention, it is possible to provide the same level of performance using such an alternative training sequence, or improve the equalizer performance using decoded control symbols as an additional training sequence to pilot sequences.

Referring now to FIG. 4, a block diagram illustrates the receiver equalization function 340, as well as the processing steps involved in the improved equalization operation, in accordance with the preferred embodiment of the present invention. Let us assume the signal $y_i$ 405 received over block i is processed by equalization filter $f_i$ 410. The processed information is then, in essence split between control channel information and data. The control channel information is demodulated 420 and decoded 430 using a Viterbi algorithm to correct any transmission errors. Afterwards, hopefully error-free control information is re-encoded in re-encoding function 425 and modulated again to produce hard decision control symbols $\hat{s}_i$. The hard decision control symbols $\hat{s}_i$ are then used to update the equalizer coefficients 450 for the next block of data received, i.e. calculate $f_{i+1}$.

Thus, for the next block of data, the signal $y_{i+1}$ received over block i+1 is processed by equalization filter $f_i$ 410. The processed information is then, in essence split again between control channel information and data. The data contained in the data channel is notably equalized using the updated coefficients from the previous block of data, before being demodulated 415 and decoded in decoder function 425.

In the preferred embodiment of the present invention, both the estimated control symbols and the pilot symbols are stacked into a single vector and their code matrices into one matrix.

$$\tilde{p}_i = \alpha \begin{bmatrix} \alpha_p \cdot p_i \\ \alpha_s \cdot \hat{s}_i \end{bmatrix} \quad \tilde{C}_i = [\, C_{p,i} \quad C_{s,i} \,] \quad [7]$$

The process then determines $f_{i+1}$ by solving the LS problem using equation [8] below:

$$\tilde{C}_i^H Y f_{i+1} = \tilde{p}_i \quad [8]$$

The solution for an over-determined LS problem is:

$$f_{i+1}=(Y_i^H \tilde{C}_i \tilde{C}_i^H Y_i)^{-1} Y_i^H \tilde{C}_i \tilde{p}_i \quad [9]$$

Alternatively, the solution for an under-determined LS problem is:

$$f_{i+1}=Y_i^H \tilde{C}_i (\tilde{C}_i^H Y_i Y_i^H \tilde{C}_i)^{-1} \tilde{p}_i \quad [10]$$

Notably, the estimation of the equalizer coefficients is delayed in a sense that the coefficients for block 'i+1' are calculated on the basis of the observation data at block 'i'. This is performed because the estimated control symbols $\hat{s}_i$ should be available before the equalizer can be computed. In order to avoid performance degradation, the block size should be selected to be small enough for the channel response to be constant over two consecutive blocks. Although, there is no such limitation in pilot-only equalizers, it is often advantageous to use delayed estimation, even in pilot-only receivers, due to timing and memory constraints in very large scale integrated (VLSI) implementations.

The complexity of the proposed scheme is obviously higher than that of the pilot trained one on its own. The increase in complexity emanated from larger dimensions of the code matrix and training data vector. On the other hand, the effect of control channel re-encoding is negligible, since the symbol rates over the shared control channel are very small. The inventors of the present invention have shown that the throughput of a HSDPA category '6' service is typically increased by ~10%.

Table 1 presented below illustrates the throughput performance improvement delivered by a HSPDA system at a category '6' service, using the proposed chip equalizer of L=10 taps and coefficients are estimated using equation [10] with B=3, and the comparable throughput of the known technique.

TABLE 1

| $I_{or}/I_{oc}$ | Profile | Throughput (known) | Throughput (proposed) |
|---|---|---|---|
| 100 | PB3 | 1263 | 1417 |
| 10 | PB3 | 1053 | 1122 |
| 100 | VA30 | 1347 | 1539 |
| 10 | VA30 | 1135 | 1241 |

From Table 1, it can be seen that the maximal throughput is increased using the proposed method; the improvement may is approximately 10%-15%. The increase in throughput is lower at lower $I_{or}/I_{oc}$.

The proposed method is more complex as a result of the dimension of the matrix to invert increases. In the known prior art, the dimension is B×B, where B is the number of pilot symbols in estimation block. Since in a block of this size there are 2B control symbols, the dimension of the matrix in the preferred embodiment can be up to 3B×3B; that is if all control symbols are used. This assumes that the complexity of structured matrix inversion is of the order $N^2$, where N is the size of the matrix.

It is envisaged that a single signal processor function 308 may be used to perform the aforementioned functions in the receive chain, as shown in FIG. 3. Alternatively, a number of processors may be used to implement the processing of received CDMA signals. Of course, the various components within the communication unit 112 may be realized in discrete or integrated component form, with an ultimate structure therefore being merely a selection based on prevailing design considerations.

More generally, the adaptation of UE 112 associated with the preferred embodiment of the present invention may be implemented in a respective communication unit (UE) in any suitable manner. For example, new apparatus may be added to a conventional communication unit, or alternatively existing parts of a conventional communication unit may be adapted, for example by reprogramming one or more processors therein. As such the required adaptation may be implemented in the form of processor-implementable instructions stored on a storage medium, such as a floppy disk, hard disk, programmable read-only memory (PROM), random access memory (RAM) or any combination of these or other storage media.

Although the preferred embodiment of the invention is described with reference to a wireless communication device such as a mobile phone employing a UMTS air-interface, it is envisaged that the aforementioned wireless communication device in the preferred embodiment of the present invention may, in alternative embodiments, be any wireless device capable of employing CDMA technology, such as one capable of operating in an adaptive modulation and coding WCDMA system.

In summary, an improved equalizer training sequence and method for equalizing in a CDMA receiver has been described.

It is envisaged that integrated circuit manufacturers may utilize the inventive concepts hereinbefore described in specialist application specific integrated circuits (ASICs) or signal processing devices capable of incorporating equalizer and/or filter functionality. For example, it is envisaged that a signal processing device may be configured to provide an equalizing function that takes into account the protected information that is obtainable from control channel signals, as substantially described with respect to the aforementioned receiver circuit arrangement.

Advantageously, the inventive concepts of the present invention provide a significant benefit to the manufacturers of CDMA receiver circuits, by increasing throughput by enabling the CDMA receiver to be able to recover data in poor propagation conditions by use of a more accurate and reliable training sequence. For example, it is also within the contemplation of the invention that alternative equalization techniques can benefit from the inventive concepts described herein.

It is further envisaged that the inventive concepts herein described are equally applicable to Multiple-Input Multiple-Output (MIMO) systems, i.e. where there is a multiple number of transmitting and receiving antennas.

In this regard, a plurality of chip equalizers would use control symbols for the equalization in MIMO systems, where the number of employed blocks can (and typically will) be equal to the number of receiving antennas.

In essence, the wireless communication unit and method proposed herein provides a more efficient low complexity chip equalizer offering improved trade-off between performance and complexity. However, it is envisaged that the inventive concepts described herein are equally applicable to any other equalizers, such as non-linear equalizers for CDMA systems.

It will be understood that the apparatus and method for providing improved training signal for an equalizer in a CDMA-based wireless communication unit, as described above, tends to provide at least one of the following advantages:

(i) It makes estimation of equalizer coefficients more reliable;
(ii) It increases maximal data throughput, say by a factor of 10%-15%; and (iii) It enables design of CDMA communication systems without the need to take into account the provision of pilot signals, thereby increasing spectral efficiency.

Whilst the specific, and preferred, implementations of the present invention are described above, it is clear that one skilled in the art could readily apply variations and modifications of such inventive concepts.

Thus a wireless communication unit, a signal processor capable of performing equalization and a method of equalization have been provided that address the aforementioned equalization problems previously described in relation to the prior art.

The invention claimed is:

1. A method of processing a code division multiple access signal comprising data channel information, a pilot signal for providing a training sequence and control channel information used in decoding said data channel information, the method comprising:
   receiving a CDMA signal;
   processing the received CDMA signal with a CDMA detector;
   extracting the control channel information from the processed CDMA signal, the control channel information identifying at least one characteristic of the received CDMA signal;
   additionally extracting pilot symbol information from the pilot signal, the control channel information being distinct from the pilot symbol information; and
   using the extracted control channel information, in addition to the extracted pilot symbol information, to equalize a subsequent received signal;
   wherein extracting the control channel information from the processed CDMA signal comprises performing error correction on the control channel information, the performance of the error correction comprising decoding the control channel information; and
   wherein extracting the control channel information from the processed CDMA signal further comprises re-encoding the decoded control channel information;
   wherein using the extracted control channel information, in addition to the extracted pilot symbol information, to equalize the subsequent received signal comprises using the re-encoded decoded control channel information to equalize the subsequent received signal;
   wherein processing the received CDMA signal comprises filtering the received CDMA signal using filter coefficients;
   wherein equalizing the subsequent received signal comprises using the re-encoded decoded control channel information to update the filter coefficients;
   wherein the extracted control channel information comprises a high spreading factor and a low modulation order.

2. A method according to claim 1, wherein processing the received CDMA signal comprises filtering the received CDMA signal using filter co-efficients; and using the extracted control channel information to equalize a subsequent received CDMA signal comprises updating the filter co-efficients using the extracted control channel information as a training sequence.

3. A method according to claim 1, wherein processing the received CDMA signal with the CDMA detector comprises processing concurrent data channel information and control channel information.

4. A method of processing a code division multiple access signal comprising data channel information, a pilot signal for providing a training sequence and control channel information used in decoding said data channel information, the method comprising:
   receiving a CDMA signal;
   processing the received CDMA signal with a CDMA detector;
   extracting the control channel information from the processed CDMA signal, the control channel information identifying at least one characteristic of the received CDMA signal;
   additionally extracting pilot symbol information from the pilot signal, the control channel information being distinct from the pilot symbol information; and
   using the extracted control channel information, in addition to the extracted pilot symbol information, to equalize a subsequent received signal;
   wherein extracting the control channel information from the processed CDMA signal comprises performing error correction on the control channel information, the performance of the error correction comprising decoding the control channel information; and
   wherein extracting the control channel information from the processed CDMA signal further comprises re-encoding the decoded control channel information;
   wherein using the extracted control channel information, in addition to the extracted pilot symbol information, to equalize the subsequent received signal comprises using the re-encoded decoded control channel information to equalize the subsequent received signal;
   wherein processing the received CDMA signal comprises filtering the received CDMA signal using filter coefficients; and
   wherein equalizing the subsequent received signal comprises using the re-encoded decoded control channel information to update the filter coefficients;
   wherein extracting the control channel information from the processed CDMA signal comprises extracting user identity information to identify whether the subsequent data should be equalized.

5. A method according to claim 4, wherein the extracted control channel information comprises a high spreading factor and a low modulation order.

6. A method of processing a code division multiple access signal comprising data channel information, a pilot signal for providing a training sequence and control channel information used in decoding said data channel information, the method comprising:
   receiving a CDMA signal;
   processing the received CDMA signal with a CDMA detector;
   extracting the control channel information from the processed CDMA signal, the control channel information identifying at least one characteristic of the received CDMA signal;
   additionally extracting pilot symbol information from the pilot signal, the control channel information being distinct from the pilot symbol information; and
   using the extracted control channel information, in addition to the extracted pilot symbol information, to equalize a subsequent received signal; wherein
   processing the received CDMA signal comprises filtering the received CDMA signal using filter co-efficients;
   using the extracted control channel information to equalize a subsequent received CDMA signal comprises updating the filter co-efficients using the extracted control channel information as a training sequence, updating the filter coefficients comprising processing the extracted control channel information and the pilot symbol information in a manner corresponding to stacking the extracted control channel information and the pilot symbol information into a single vector, $\tilde{p}_i$, where i is a block number;

updating the filter coefficients comprises processing respective spreading factor matrices of the extracted control channel information and the pilot symbol information in a manner corresponding to stacking the respective spreading factor matrices of the extracted control channel information and the pilot symbol information into a single matrix, $\tilde{C}_i$, where i is a block number; and updating filter coefficients comprises estimating filter coefficients, $f_i$, using the equation:

$$f_{i+1} = Y_i^H \tilde{C}_i (\tilde{C}_i^H Y_i Y^H \tilde{C}_i)^{-1} \tilde{p}_i$$

where Y is a Toeplitz convolution matrix based upon a vector of received signal, y; and H is a Toeplitz convolution matrix based upon a channel response, h.

7. A method according to claim 1, wherein using the extracted control channel information to equalize the subsequent received CDMA signal is performed on a chip equalizer.

8. A method according to claim 1, wherein the extracted control channel information is used in an adaptive modulation and coding system as a training sequence for a CDMA downlink chip equalizer.

9. A method according to claim 1, wherein the extracted control channel information is used as a training sequence for equalization in a MIMO system.

10. An integrated circuit comprising:
a code division multiple access detector having an equalizer function;
a signal processing function for processing a received CDMA signal comprising data channel information, a pilot signal for providing a training sequence and control channel information used for decoding said data channel information;
wherein the equalizer function is operably coupled to the signal processing function and configured to equalize the received CDMA signal;
wherein the signal processing function is arranged to extract the control channel information from the processed CDMA signal, the control channel information identifying at least one characteristic of the received CDMA signal, and additionally to extract pilot symbol information from the pilot signal, the control channel information being distinct from the pilot symbol information;
wherein the signal processing function is also arranged to extract the control channel information from the processed CDMA signal by performing error correction on the control channel information comprising decoding the control channel information;
wherein the signal processing function is further arranged to extract the control channel information from the processed CDMA signal by re-encoding the decoded control channel information; and
wherein the equalizer function is arranged to equalize a subsequent received CDMA signal using the extracted control channel information in addition to the extracted pilot symbol information;
wherein the use of the extracted control channel information, in addition to the extracted pilot symbol information, to equalize the subsequent received signal comprises the equalizer function using the re-encoded decoded control channel information to equalize the subsequent received signal;
wherein the equalizer function is a filter arranged to equalize the received CDMA signal using filter coefficients; and
wherein the equalization of the subsequent received signal comprises the equalizer function using the re-encoded decoded control channel information to update the filter coefficients;
wherein the extracted control channel information comprises a high spreading factor and a low modulation order.

11. An integrated circuit according to claim 10, wherein the equalizer function comprises a filter configured to receive updated filter co-efficients generated in response to the received control channel information.

12. A wireless communication unit comprising:
a code division multiple access receiver having:
a signal processing function for processing a received CDMA signal comprising data channel information, a pilot signal for providing a training sequence and control channel information used for decoding said data channel information; and
an equalizer function operably coupled to the signal processing function and arranged to equalize the received CDMA signal;
wherein the signal processing function is arranged to extract the control channel information from the processed CDMA signal, the control channel information identifying at least one characteristic of the received CDMA signal, and additionally to extract pilot symbol information from the pilot signal, the control channel information being distinct from the pilot symbol information;
wherein the signal processing function is also arranged to extract the control channel information from the processed CDMA signal by performing error correction on the control channel information comprising decoding the control channel information;
wherein the signal processing function is further arranged to extract the control channel information from the processed CDMA signal by re-encoding the decoded control channel information; and
wherein the equalizer function is arranged to equalize a subsequent received CDMA signal using the extracted control channel information in addition to the extracted pilot symbol information;
wherein the use of the extracted control channel information, in addition to the extracted pilot symbol information, to equalize the subsequent received signal comprises the equalizer function using the re-encoded decoded control channel information to equalize the subsequent received signal;
wherein the equalizer function is a filter arranged to equalize the received CDMA signal using filter coefficients;
wherein the equalization of the subsequent received signal comprises the equalizer function using the re-encoded decoded control channel information to update the filter coefficients;
wherein the extracted control channel information comprises a high spreading factor and a low modulation order.

13. A wireless communication unit according to claim 12, wherein the equalizer function is a filter equalizing the received CDMA signal using filter coefficients and the extracted control channel information is used as a training sequence to update the filter co-efficients.

14. A wireless communication unit comprising:
a code division multiple access receiver having:
a signal processing function for processing a received CDMA signal comprising data channel information, a pilot signal for providing a training sequence and control channel information used for decoding said data channel information; and
an equalizer function operably coupled to the signal processing function and arranged to equalize the received CDMA signal; wherein
the signal processing function is arranged to extract the control channel information from the processed CDMA signal, the control channel information identifying at least one characteristic of the received CDMA signal, and additionally to extract pilot symbol information from the pilot signal, the control channel information being distinct from the pilot symbol information;
the equalizer function is arranged to equalize a subsequent received CDMA signal using the extracted control channel information in addition to the extracted pilot symbol information;
the equalizer function is a filter equalizing the received CDMA signal using filter coefficients and the extracted control channel information is used as a training sequence to update the filter co-efficients;
the equalizer function is arranged to update the filter coefficients by processing the extracted control channel information and the pilot symbol information in a manner corresponding to stacking the extracted control channel information and the pilot symbol information into a single vector, $\tilde{p}_i$ where i is a block number;
the equalizer function is arranged to update the filter coefficients by processing respective spreading factor matrices of the extracted control channel information and the pilot symbol information in a manner corresponding to stacking the respective spreading factor matrices of the extracted control channel information and the pilot symbol information into a single matrix $\tilde{C}_i$, where i is a block number; and
the signal processing function estimates filter coefficients using the equation:

$$f_{i+1} = Y_i^H \tilde{C}_i (\tilde{C}_i^H Y_i Y_i^H \tilde{C}_i)^{-1} \tilde{p}_i$$

where Y is a Toeplitz convolution matrix based upon a vector of received signal, y; and
H is a Toeplitz convolution matrix based upon a channel response, h.

15. A wireless communication unit according to claim 12, wherein the signal processor function is arranged to extract user identity information from the control channel information to identify whether the subsequent data should be equalized.

16. A wireless communication unit according to claim 12, wherein the equalizer function is a chip equalizer.

17. A wireless communication unit according to claim 12, wherein the wireless communication unit is configured to operate in an adaptive modulation and coding system.

18. A wireless communication unit according to claim 12, wherein the wireless communication unit is configured to operate in a CDMA MIMO system.

19. A signal processing function comprising a CDMA receiver according to claim 12.

20. A communication system adapted to support a wireless communication unit according to claim 12.

21. A communication system according to claim 20, wherein the communication system is an adaptive modulation and coding system.

22. A communication system according to claim 20, wherein the communication system is a MIMO system.

23. A method according to claim 1, wherein the re-encoded decoded control channel information constitutes hard decision control symbols.

24. A wireless communication unit according to claim 12, wherein the re-encoded decoded control channel information constitutes hard decision control symbols.

25. The method according to claim 1, wherein the re-encoding of the decoded control channel information is performed after the error correction to provide the extracted control channel information.

26. The wireless communication unit according to claim 12, wherein the re-encoding of the decoded control channel information is performed after the error correction to provide the extracted control channel information.

27. The method according to claim 1, wherein extraction of the control channel information from the processed CDMA signal is in respect of a High-Speed Shared Control Channel (HS-SCCH).

28. The wireless communication unit according to claim 12, wherein extraction of the control channel information from the processed CDMA signal is in respect of a High-Speed Shared Control Channel (HS-SCCH).

29. The integrated circuit according to claim 10, wherein the re-encoding of the decoded control channel information is performed after the error correction to provide the extracted control channel information.

30. integrated circuit according to claim 10, wherein extraction of the control channel information from the processed CDMA signal is in respect of a High-Speed Shared Control Channel (HS-SCCH).

31. An integrated circuit comprising:
a code division multiple access detector having an equalizer function;
a signal processing function for processing a received CDMA signal comprising data channel information, a pilot signal for providing a training sequence and control channel information used for decoding said data channel information;
wherein the equalizer function is operably coupled to the signal processing function and configured to equalize the received CDMA signal;
wherein the signal processing function is arranged to extract the control channel information from the processed CDMA signal, the control channel information identifying at least one characteristic of the received CDMA signal, and additionally to extract pilot symbol information from the pilot signal, the control channel information being distinct from the pilot symbol information;
wherein the signal processing function is also arranged to extract the control channel information from the processed CDMA signal by performing error correction on the control channel information comprising decoding the control channel information;
wherein the signal processing function is further arranged to extract the control channel information from the processed CDMA signal by re-encoding the decoded control channel information; and wherein the equalizer function is arranged to equalize a subsequent received CDMA signal using the extracted control channel information in addition to the extracted pilot symbol information;

wherein the use of the extracted control channel information, in addition to the extracted pilot symbol information, to equalize the subsequent received signal comprises the equalizer function using the re-encoded decoded control channel information to equalize the subsequent received signal;

wherein the equalizer function is a filter arranged to equalize the received CDMA signal using filter coefficients;

wherein the equalization of the subsequent received signal comprises the equalizer function using the re-encoded decoded control channel information to update the filter coefficients;

wherein the signal processing function being arranged to extract the control channel information from the processed CDMA signal includes the signal processing function being arranged to extract user identity information to identify whether the subsequent data should be equalized.

32. A wireless communication unit comprising:

a code division multiple access receiver having:

a signal processing function for processing a received CDMA signal comprising data channel information, a pilot signal for providing a training sequence and control channel information used for decoding said data channel information; and an equalizer function operably coupled to the signal processing function and arranged to equalize the received CDMA signal;

wherein the signal processing function is arranged to extract the control channel information from the processed CDMA signal, the control channel information identifying at least one characteristic of the received CDMA signal, and additionally to extract pilot symbol information from the pilot signal, the control channel information being distinct from the pilot symbol information;

wherein the signal processing function is also arranged to extract the control channel information from the processed CDMA signal by performing error correction on the control channel information comprising decoding the control channel information;

wherein the signal processing function is further arranged to extract the control channel information from the processed CDMA signal by re-encoding the decoded control channel information; and wherein the equalizer function is arranged to equalize a subsequent received CDMA signal using the extracted control channel information in addition to the extracted pilot symbol information;

wherein the use of the extracted control channel information, in addition to the extracted pilot symbol information, to equalize the subsequent received signal comprises the equalizer function using the re-encoded decoded control channel information to equalize the subsequent received signal;

wherein the equalizer function is a filter arranged to equalize the received CDMA signal using filter coefficients;

wherein the equalization of the subsequent received signal comprises the equalizer function using the re-encoded decoded control channel information to update the filter coefficients;

wherein the signal processing function being arranged to extract the control channel information from the processed CDMA signal includes the signal processing function being arranged to extract user identity information to identify whether the subsequent data should be equalized.

* * * * *